United States Patent [19]
Nitterl et al.

[11] 3,756,510
[45] Sept. 4, 1973

[54] MEANS FOR HEATING WINDSHIELD WASHER FLUID

[75] Inventors: Ludwig Nitterl, Ingolstadt; Karsten Ehlers, Semmelweisring 3, Wolfsburg, both of Germany

[73] Assignee: said Nitterl, by said Ehlers

[22] Filed: Mar. 15, 1972

[21] Appl. No.: 234,882

[30] Foreign Application Priority Data
Mar. 16, 1971 Germany................... P 21 12 473.2

[52] U.S. Cl.............................. 239/129, 239/130
[51] Int. Cl............................................. B05b 1/24
[58] Field of Search ..............................239/129–131

[56] References Cited
UNITED STATES PATENTS
2,260,904  10/1941  Horton................................ 239/130
3,366,336  1/1968  Neuschwanger et al............ 239/129

Primary Examiner—Robert S. Ward, Jr.
Attorney—Eric H. Waters et al.

[57]   ABSTRACT

A washing device for windows of motor vehicles, in which the washing fluid coming from a container is heated in a heat exchanger located in a duct connecting the cooling jacket of an internal combustion engine with a special heat exchanger which surrounds the wall of the intake manifold of the internal combustion engine to prevent vapor lock. The washer fluid is conducted to the window spray jets after passage through the first mentioned heat exchanger.

9 Claims, 2 Drawing Figures

PATENTED SEP 4 1973 3,756,510

MEANS FOR HEATING WINDSHIELD WASHER FLUID

BACKGROUND

1. Field of the Invention

The invention relates to a heatable means for washing fluid for windows of motor vehicles, by which washing fluid coming from a container is heated in a heat exchanger located in a duct which connects the cooling jacket of an internal combustion engine with a special heat exchanger, the thus heated washing fluid being conveyed to the window spray jets.

2. Prior Art

It is known to employ the fluid flowing from the cooling jacket of an internal combustion engine to the heater (for heating the passenger compartment) to heat the washing fluid (U.S. Pat. No. 2,260,904).

The heat exchanger for the passenger compartment and the radiator should not be operated when the internal combustion engine of the motor car vehicle is warming up since on the one hand little heat will be supplied and on the other hand this would increase the time for the warming up of the internal combustion engine.

In the case of so-called water-controlled heat exchangers which are in common usage, the connection between the cool-ant jackets and the heat exchanger is only made when the heater is switched on, i.e. only in the winter. During the summer it thus does not become possible to heat the washing fluid for the windshield without turning the heater on.

SUMMARY OF THE INVENTION

It is an object of this invention to provide a washing system for the windows of a motor car vehicle in which heated fluid will be supplied in any season of the year and after a short time to warm up the engine.

The invention contemplates locating the heat exchanger for the washing fluid in surrounding relation on the wall of the intake manifold of the internal combustion engine to prevent vapor lock.

The aforesaid heat exchanger is constructed as a preheating container for the intake manifold and is connected to the coolant jackets during all operating conditions of the internal combustion engine, because preheating the intake manifold is necessary to warm the engine correctly.

Consequently the apparatus according to this invention supplies warm water to wash the windows of the motor vehicle in summer as well as in winter with very little time to warm up the engine.

In addition, the washing fluid conduit includes a wound or coiled portion extending into the coolant duct and the coiled portion defines a passageway therein having a cross-sectional area of flow for the coolant which is substantially equal to the area of the inlet and the outlet of the coolant duct. In this manner the washing fluid in the coil-shaped portion can be warmed up by exchange of heat with the coolant from the internal combustion engine without limiting the flow of coolant to the pre-warming exchanger of the intake manifold.

Finally, the coolant duct can consist of a cylindrical center portion having opposite ends with plugs thereon, the coiled portion of the washing fluid conduit extending in the cylindrical portion and passing through openings provided in the plugs. This allows simple connection of the conduit and the coil-shaped portion and, for example, they can be connected by soldering.

DETAILED DESCRIPTION

Figure 1:
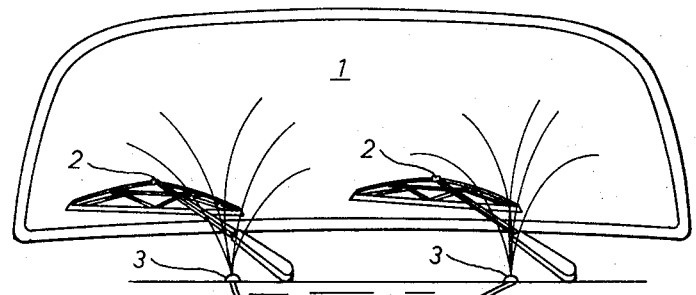
FIG. 1 is a diagrammatic illustration showing the windshield of a motor car and the washing equipment for the windshield.
Figure 2:
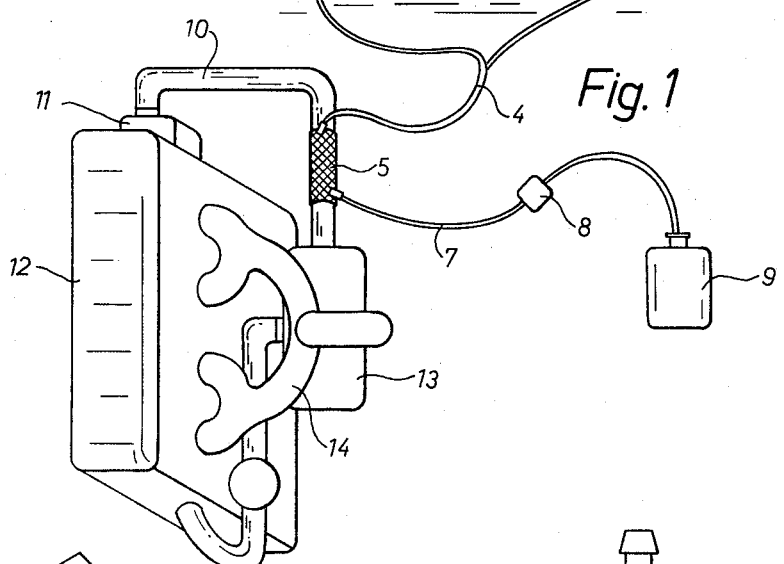
FIG. 2 is a sectional view of the heat exchanger in the washing equipment of FIG. 1 on enlarged scale.
Figure 2:
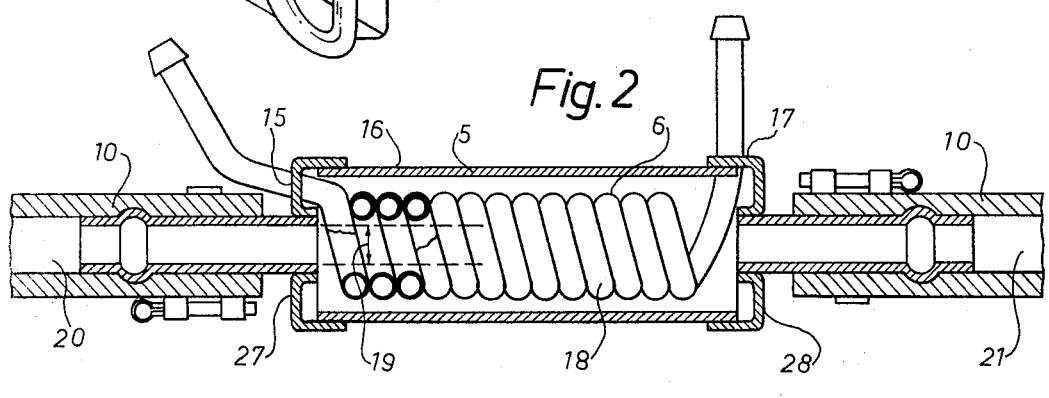

Referring to FIG. 1 of the drawing, therein is seen the windshield 1 of a motor car. Windshield wipers 2 and spray jets 3 are located in front of the windshield 1. A conduit 4 connects the spray jets 3 with a heat exchanger 5, which contains a coil-shaped duct 6 as shown in FIG. 2. The conduit 4 connects to the duct 6 and the latter in turn is connected to conduit 7, which leads to a pump 8, which in turn draws the washing fluid from a container 9.

The heat exchanger 5 is located in a duct 10, which connects cooling jacket 11 of an internal combustion engine 12 with a heat exchanger 13 which surrounds the walls of intake manifold 14 of the engine 12 to prevent vapor lock. The duct 6 for washing fluid (FIG. 2) extends from inlet 15 through casing 16 to outlet 17. The duct 6 is helically wound from inlet 15 to outlet 17, so as to form abutting windings 18 of coil-shape defining an open inner through-passageway 19 for flow of the coolant through the heat exchanger. The cross sectional area of passageway 19 is equal to the area of the inlet cross secton 20 and the area of the outlet cross section 21 of the coolant conducting duct 10.

The housing of the heat exchanger comprises the center casing 16 and two mushroom-shaped plugs 27 and 28 which close the ends of the casing.

The flow of the coolant through the heat exchanger is countercurrent to the flow of the washing fluid.

What is claimed is:

1. Apparatus for supplying heated washing fluid to the spray jets of a window washer device of a motor vehicle, the vehicle having an internal combustion engine with an intake manifold, and a cooling jacket for flow of coolant around the engine, said apparatus comprising a container for washing fluid, conduit means extending from said container to the spray jets for conveying washing fluid therebetween, a heat exchanger surrounding the intake manifold of the engine, a duct connected between the cooling jacket of the internal combustion engine and the heat exchanger surrounding the intake manifold engine for flow of coolant, the heat exchanger serving to prevent vapor lock, and a second heat exchanger incorporated in said duct between the heating jacket and the first heat exchanger, said conduit means passing through said second heat exchanger so that washing fluid passing therethrough can undergo heat exchange with coolant passing through said duct.

2. Apparatus as claimed in claim 1 wherein the construction of the second heat exchanger is such that the coolant and washing fluid flow in countercurrent in said second heat exchanger.

3. Apparatus as claimed in claim 1 wherein said second heat exchanger comprises a housing, said conduit means including a coil-shaped portion in said housing defining a clear passageway through which the coolant travels.

4. Apparatus as claimed in claim 3 wherein said duct has an inlet leading into said second heat exchanger and an outlet leading from said second heat exchanger, said inlet and outlet having equal cross-sectional areas which are respectively equal to the cross-sectional area of said passageway.

5. Apparatus as claimed in claim 4 wherein said coil shaped portion comprises windings in abutment with one another.

6. Apparatus as claimed in claim 5 wherein said housing comprises a cylindrical casing having opposite ends, and cover plugs closing the ends of the casing.

7. Apparatus as claimed in claim 6 wherein said coil-shaped portion of the duct is confined to the cylindrical casing.

8. Apparatus as claimed in claim 6 wherein said plugs each has an opening for passage of the conduit means therethrough.

9. Apparatus as claimed in claim 8 wherein said duct is connected to said plugs for flow of the coolant into and from the second heat exchanger.

* * * * *